US00RE40475E

(19) United States
(12) Reissued Patent
Hornbostel et al.

(10) Patent Number: US RE40,475 E
(45) Date of Reissued Patent: Sep. 2, 2008

(54) SOURCE WAVEFORMS FOR ELECTROSEISMIC EXPLORATION

(75) Inventors: Scott C. Hornbostel, Houston, TX (US); Arthur H. Thompson, Houston, TX (US)

(73) Assignee: Exxon Mobil Upstream Research Company, Houston, TX (US)

(21) Appl. No.: 10/826,174

(22) Filed: Apr. 16, 2004

Related U.S. Patent Documents

Reissue of:
(64) Patent No.: 6,477,113
Issued: Nov. 5, 2002
Appl. No.: 09/809,472
Filed: Mar. 15, 2001

U.S. Applications:
(60) Provisional application No. 60/191,041, filed on Mar. 21, 2000.

(51) Int. Cl.
*G01V 1/00* (2006.01)
*G01V 3/00* (2006.01)
*G01V 1/40* (2006.01)

(52) U.S. Cl. ..... 367/38; 324/323; 181/106
(58) Field of Classification Search ..... 367/14, 367/191, 38–42; 324/323, 334, 359, 360, 324/354; 181/104, 106
See application file for complete search history.

(56) References Cited

U.S. PATENT DOCUMENTS 4,295,213 A * 10/1981 Mifsud ..... 367/41
4,467,283 A * 8/1984 Owen et al. ..... 324/363
4,583,095 A * 4/1986 Peterson ..... 324/330
4,904,942 A * 2/1990 Thompson ..... 367/14
5,841,280 A 11/1998 Yu et al. ..... 324/323
5,877,995 A 3/1999 Thompson et al. ..... 367/14
6,427,774 B2 * 8/2002 Thomas et al. ..... 166/248
6,597,633 B1 * 7/2003 Millar et al. ..... 367/35

OTHER PUBLICATIONS

*Digital Communications with Space Applications,* pp. 1–20, 165–167, Solomon W. Golomb, editor, Prentice–Hall Inc. (1964).
Zierler, Neal, "Linear Recurring Sequences", *J. Soc. Indust. Appl. Math.,* vol. 7 (1), pp. 31–48 (1959).
Cunningham, Allen B., "Some Alternate Vibrator Signals," *Geophysics* vol. 44 (12), pp. 1901–1921, (1979).
Duncan, P.M. et al, "The Development and Applications of a Wide Band Electromagnetic Sounding System Using a Pseudo–Noise Source," *Geophysics* vol. 45 (8), pp. 1276–1296, (Aug. 1980).
Foster, M.R. et al, "The Use of Pseudonoise Sequences to Code a Pulsed Neutron Logging Source," *Geophysics* vol. 37 (3), pp. 481–487, (Jun. 1972).
Kounias, S., et al, "On Golay Sequences," *Discrete Mathematics 92,* pp. 177–185, (1991).
Yilmaz, O. "Seismic Data Processing," *Society of Exploration Geophysicists,* pp. 18–19, (1987).
Golay, M.J.E., "Complementary Series", *IRE Transactions on Information Theory,* 7, pp. 82–87, (1961).

* cited by examiner

*Primary Examiner*—Jack W. Keith
*Assistant Examiner*—Scott A Hughes

(57) ABSTRACT

A method for seismic exploration using conversions between electromagnetic and seismic energy, with particular attention to the electromagnetic source waveform used. According to the invention, source waveforms are correlated with reference waveforms selected to minimize correlation side lobes. Line power at 60 Hz may be used to provide a waveform element which may be sequenced by a binary code to generate an extended source waveform segment with minimal correlation side lobes. Preferred binary codes include Golay complementary pairs and maximal length shift-register sequences.

30 Claims, 5 Drawing Sheets

SOURCE WAVEFORMS FOR ELECTROSEISMIC EXPLORATION

Matter enclosed in heavy brackets [ ] appears in the original patent but forms no part of this reissue specification; matter printed in italics indicates the additions made by reissue.

This application claims the benefit of U.S. Provisional Application No. 60/191,041 filed on Mar. 21, 2000.

FIELD OF THE INVENTION

This invention relates to the field of geophysical prospecting. More particularly, the invention pertains to source waveforms for use in electroseismic exploration.

BACKGROUND OF THE INVENTION

The electroseismic method is a geophysical prospecting tool aimed at creating images of subsurface formations using conversions between electromagnetic and seismic energy. The electroseismic method is described in U.S. Pat. No. 5,877,995 (Thompson. et al.). The essence of the electroseismic method is that high levels of electrical energy are transmitted into the ground at or near the surface, and the electrical energy is converted to seismic energy by the interaction of underground fluids, including hydrocarbons, with the rock matrix. The seismic waves are detected at or near the surface by seismic receivers. To be effective, this method requires an input current source with the following characteristics:

- The source should produce large current levels over extended time.
- The source should have high electrical efficiency.
- The source should contain little or no DC to avoid plating the electrode array.
- The frequency content of the source should be adequate for the exploration needs.
- The correlation of the source waveform with its reference should have sufficiently low side lobe levels.

Little has been published to date on electroseismic waveforms because of the newness of the technique. However, in conventional seismic exploration, a seismic vibrator is sometimes used as an energy source to generate a controlled wavetrain (known as a sweep) which is injected into the earth. When the resulting recorded seismic data are correlated with the sweep wavetrain or other reference, the correlated record resembles a conventional seismic record such as that which results from an impulsive source.

When a source waveform is correlated with its associated reference, there will typically be a large peak at the onset time of the waveform surrounded by lower peaks at earlier and later times. These lower peaks are the correlation side lobes. Correlation side lobes are undesirable because they can mask smaller desired seismic returns.

It should be noted that the source waveform is just one piece of the electroseismic system. Other factors of importance include the power waveform synthesizer (that creates the waveform) as well as the input electrode array, the seismic receiver arrays and various field implementation issues.

As stated above, there is little current technology on electroseismic waveforms because of the newness of the technique. Some obvious approaches might include pulsing or pseudo-random square-wave sequences. Repeated pulses are inefficient (in energy/second) compared to continuous waveforms. Square-wave waveforms would be expensive to implement at the required high current levels and would also dissipate energy in unwanted high-frequency components.

What is needed is a source waveform that satisfies the requirements stated above. The present invention satisfies this need.

SUMMARY OF THE INVENTION

In one embodiment, the present invention is a method for electroseismic prospecting comprising the steps of (a) selecting a source waveform and corresponding reference waveform, both chosen to reduce correlation side lobe amplitudes, (b) generating an electrical signal based on the source waveform, (c) transmitting the electrical signal into the ground, (d) detecting and recording the seismic signals resulting from conversion of the electrical signal to seismic energy in subterranean formations, and (e) correlating the resulting seismic signals with a reference waveform to produce a correlated seismic record. Preferably, the reference waveform is chosen to substantially minimize side lobes when correlated with the particular source waveform used.

The source waveform may be constructed from individual cycles of a 60 cycles/sec (Hz) sine wave, i.e., standard AC electrical power, with the polarity of some such cycles inverted as governed by a binary sequence code. The binary code is selected to custom design an extended, but finite, source wave that has a reference wave that substantially minimizes correlation side lobes when the source wave and the reference wave are correlated together. The reference wave may be the source wave itself or a waveform derived from the source wave. Where deeper penetration of the subsurface is desired, another embodiment of the present invention constructs frequencies lower than 60 Hz by switching between the three phases of a 3-phase power source.

In some embodiments of the invention, the binary sequence used is a maximal length shift-register sequence, and circular correlation (defined below) is used for the last step. In other embodiments, two source waves are transmitted into the ground. One is a 60 Hz sinusoid wave element sequenced by one member of a Golay complementary sequence pair; the other is the same wave element sequenced by the other Golay pair member. The resulting seismic returns are separately correlated with their respective input waves and then summed. Both the Golay sequences and the maximal length shift-register sequence have excellent correlation side lobe reduction properties, with the side lobes being theoretically reduced to zero in the case of the Golay sequences.

According to the present invention, side lobes may be further reduced, for any pseudo-random binary sequence-generated source waveform, by making the source wave as long as possible before recording equipment limitations require that the source generation must be interrupted.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for determining source waveforms to use for electroseismic prospecting for oil and gas. The source signals taught by the present invention in some of its embodiments are in the class of binary-coded waveforms. A binary-coded waveform consists of a sequence of elements. The individual elements might be, for example, a single cycle of a 60 Hz sine wave. In fact, waveforms that are made up of segments of 60 Hz sinusoids (or whatever the local commercial power frequency may be) are particularly economical for the electroseismic case because this source type can be formed using simple switching of commercial powerline signals. These waveform segments are pieced together with polarities specified by a binary sequence. Preferably, the binary sequence is designed, as explained below, to give minimal side lobes while the waveform element is designed to optimize the frequency content of the source.

Figure 1A:
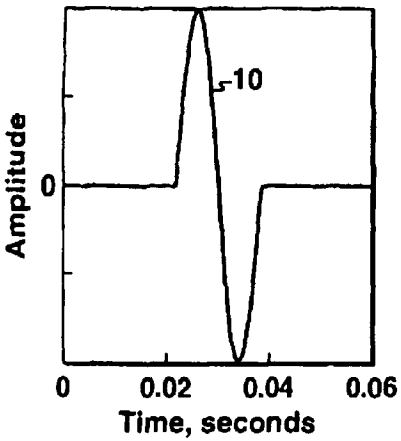
FIG. 1A illustrates a 60 Hz waveform element.
Figure 1B:
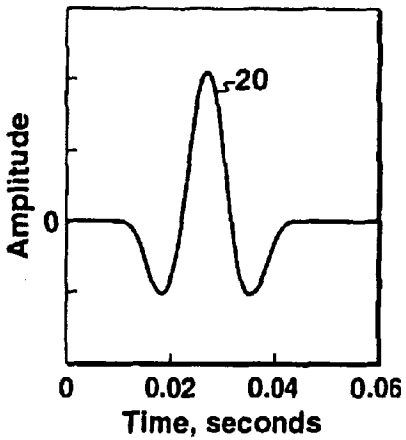
FIG. 1B illustrates the autocorrelation of such waveform element.

The autocorrelation of a binary-coded waveform will give a main wavelet that is the autocorrelation of the individual waveform element. (See the discussion below of Golay sequences for an example of this.) FIG. 1A shows a single cycle 10 of a 60 Hz sinusoid. Its autocorrelation 20 is given in FIG. 1B. This is easily understood by referring to, for example, Seismic Data Processing, Ozdogan Yilmaz, Society of Exploration Geophysicists, 1987, 18–19. This waveform element 10 is probably adequate for relatively shallow targets. Different elements with lower frequencies can be constructed when three-phase power is available. An example 30 is given in FIG. 1C with its associated autocorrelation 40 in FIG. 1D.

Figure 1C:
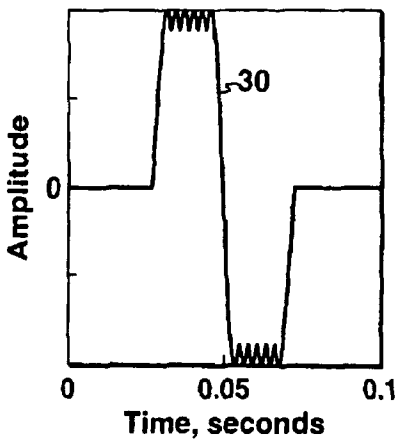
FIG. 1C shows a waveform element of frequency less than 60 Hz, constructed from three-phase 60 Hz waves.
Figure 1D:
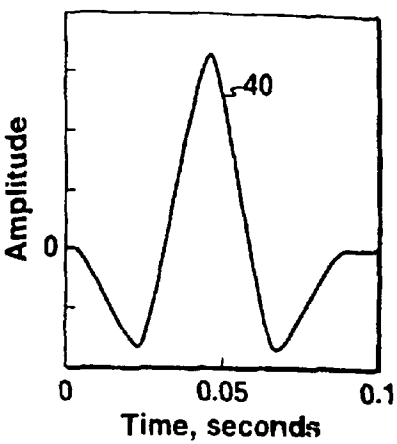
FIG. 1D shows the autocorrelation of the waveform element of FIG. 1C.

By way of further explanation of FIG. 1C, three-phase power provides six sinusoids with 60 degrees of phase shift between them. A variety of approximately square-wave signals can be constructed by switching from one sinusoid to the next at the crossover point. As one signal starts to fall off from its peak, the output is switched to the next signal which is rising to its peak. In this manner, an approximate square wave can be constructed. The square wave can be made with a desired width that has an integer number of such cycle switches, and hence with a corresponding frequency less than 60 Hz. FIG. 1C illustrates an example where the peak is prolonged by switching five times to the next-in-phase sinusoid to yield a square wave with frequency of about 20 Hz.

The construction of the waveform element is an important aspect of the design of the electroseismic source. Methods such as genetic algorithms can be used to determine a desirable element for a given target with specified seismic attenuation and electromagnetic skin depth. In general, the deeper the target, the lower the preferred frequency because higher frequencies tend to be absorbed, reducing efficiency. Fortuitously, 60 Hz gives good results for targets between approximately 100 and 500 feet in depth, for typical sediments. Furthermore, the 60 Hz wave element, although not preferred, may be used successfully to much greater depths, on the order of 5,000 feet. The practical and convenience advantages of constructing the waveform from 60 Hz line power will be obvious to those trained in the seismic art. Furthermore, such hardware implementation is easier for a single frequency sinusoid wave element, in part because efficiency does not have to be sacrificed for broadband amplification.

Correlation side lobes are of critical importance in electroseismic exploration because there can be a very large peak at zero time. This large peak comes from unavoidable direct pickup at the receivers from fields related to the input currents. The large peaks will have significant correlation side lobes. Even though these direct-pickup side lobes are reduced from the peak amplitude, they may still be large enough to mask the much smaller desired electroseismic returns. The level of the direct pickup can be moderated by proper field design and/or by other innovations such as receiver modifications; nonetheless, it is best to minimize the impact of the direct pickup by using a source waveform with minimal correlation side lobes. (Correlating with the appropriate reference waveform for the source waveform will reduce all side lobes, including the direct pickup side lobes because the direct pickup also is caused by the applied signal.)

In the preceding discussion of correlating a source wave with a reference wave to minimize side lobes, the source wave is a surrogate for the electroseismic response. In the present invention, it is the recorded seismic response to the electrical source wave that is correlated, in a later processing step, with the chosen reference wave. The present invention is based on detecting the linear component of the electroseismic response. As a consequence of linearity, such response will be proportional to the source wave. Therefore, custom-designing a source wave and a reference wave to have a large central peak and minimal side lobes when correlated together insures that the seismic response to that same source wave will similarly produce a large central peak and minimal side lobes when correlated with that same reference wave.

There are at least two types of binary sequences that according to the present invention are well suited for electroseismic waveforms. One is the maximal length shift-register sequence which is found in Golomb, S., Digital Communications with Space Applications, Prentice Hall, Inc. (1964). The other is the Golay complementary sequence pair, which is found in Golay, M. J. E., "Complementary Series", IRE Transactions on Information Theory (1961) Vol. 7, 82–87. These sequences can be configured to give substantially minimal correlation side lobes.

Golay Sequence

Figure 2A:
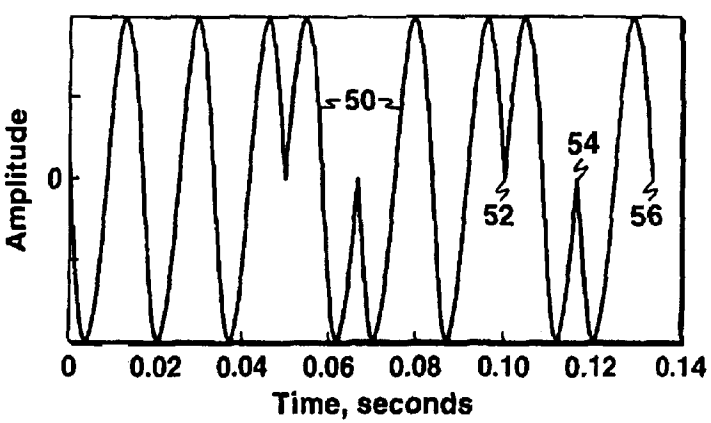
FIG. 2A and FIG. 2B show a Golay complementary sequence pair with a 60 Hz waveform element.
Figure 2B:
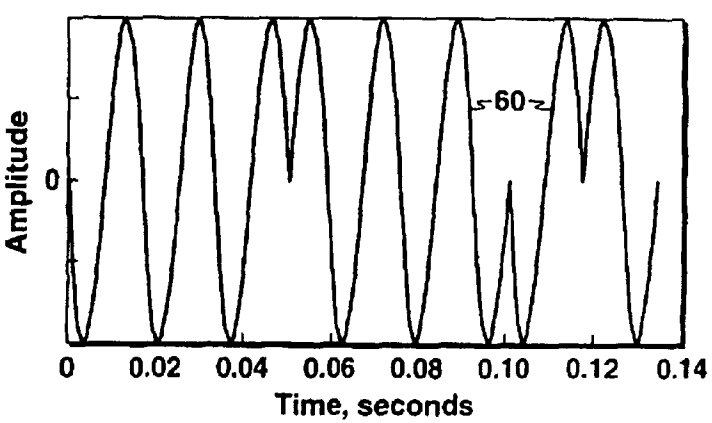

In one embodiment, the present invention uses sinusoidal wave elements sequenced by Golay complementary sequence pairs. A complimentary pair of Golay series is defined by Golay as a pair of equally long, finite sequences of two kinds of elements which have the property that the number of pairs of like elements with any one given separation in one series (viewing each series as cyclical for purposes of determining separation) is equal to the number of pairs of unlike elements with the same given separation in the other series. These sequence pairs have the property that the sums of the sequence autocorrelations have zero side lobes. One such pair of length 8 is {−1 −1 −1 1 −1 −1 1 −1} and {−1 −1 −1 1 1 1 −1 1}. This pair of series can be seen to satisfy the definition given above. For example, taking a separation of 3 spaces, the first series has 6 like pairs and 2 unlike pairs while the second series has 2 like pairs and 6 unlike, and so on. This pair of series of length 8 is shown in FIGS. 2A and 2B with a 60 Hz element. FIG. 2A shows the first-mentioned sequence 50; FIG. 2B shows the second mentioned sequence 60. A "1" in either sequence means a single cycle of 60 Hz sinusoid with normal polarity, illustrated by the cycle starting at 52 and ending at 54 in FIG. 2A; a "−1" means a 60 Hz wave element with inverted polarity, illustrated by the cycle starting at 54 and ending at 56 in FIG. 2A.

Figure 3C:
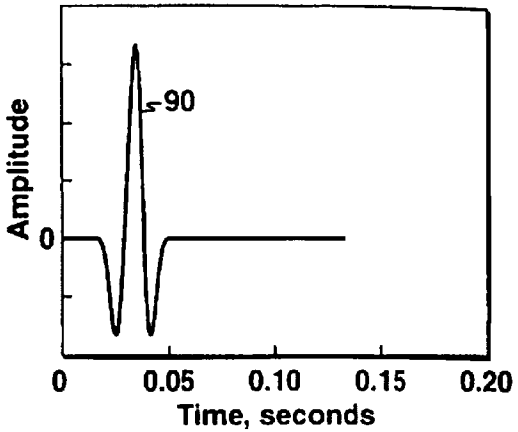
FIG. 3C illustrates the sum of these autocorrelations.
Figure 3B:
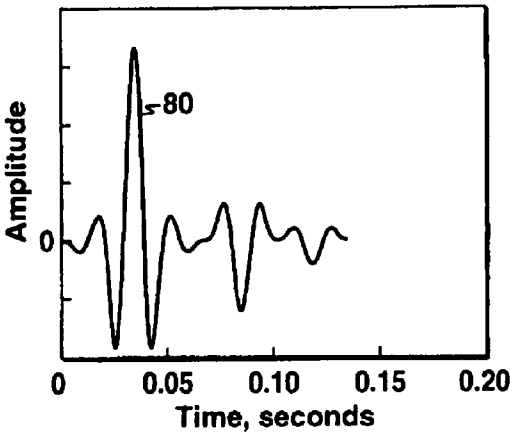
FIG. 3A and FIG. 3B show the autocorrelation of the waves in FIG. 2A and FIG. 2B, respectively.
Figure 3A:
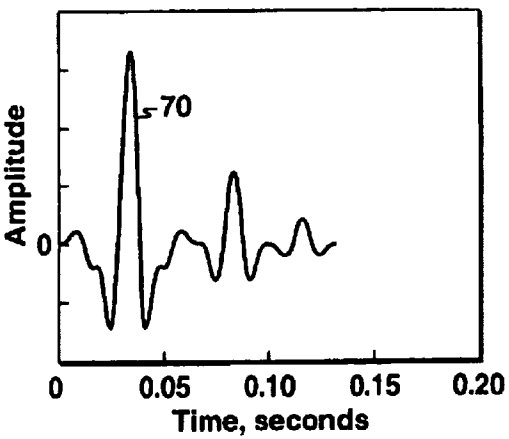

The autocorrelations and sum are shown in FIGS. 3A–C. FIG. 3A shows the autocorrelation 70 of the extended waveform segment 50; autocorrelation 80 of extended waveform segment 60 is shown in FIG. 3B. FIG. 3C depicts the sum 90 of autocorrelations 70 and 80. In theory, the side lobes cancel completely. The sequence-pair approach is also very efficient in the sense that the waveform is continuous, i.e., without breaks as contrasted with, for example, the modified shift-register sequence described below. The drawback is that the side lobe cancellation is theoretical, depending as it does on proper subtraction of the relatively large side lobes of autocorrelations 70 and 80. This can be problematic in practice where there can be frequency drifts in the power supply or fluctuations in the signal amplitude.

Registering the sequence to a reference line frequency, scaling the data to match amplitudes, and selecting particular Golay sequence pairs that have relatively low side lobes at the lags of interest can minimize these problems.

For a typical field implementation, a preferred embodiment of the present invention might include a 60 Hz waveform element and a Golay sequence of length 1664 (27.7 seconds). Golay sequences can be constructed of smaller sequences using methods discussed in Kounias, S., Koukouvinos, C., and Sotirakoglou, K., "On Golay Sequences", Discrete Mathematics, (1991) Elsevier Science Publishers B. V., Vol. 92, 177–185. Golay sequences exist only in certain lengths, e.g., there are Golay sequences of length 8 but none of length 6. Golay showed that sequences exist for lengths given by $2^j\ 10^k\ 26^l$, where j, k, and l are nonnegative integers, i.e., 0, 1, 2 . . . (see Kounias, p. 178). Other lengths that can, but not necessarily do, have Golay sequence pairs are given by $a^2+b^2$ where a and b are integers (including zero). For lengths up to 50, Golay claims sequence pairs exist for the following lengths; 2, 4, 8, 10, 16, 18, 20, 26, 32, 34, 36, 40 and 50 (see Golay, pg. 84). Kounias provides an algorithm for generating solutions for a given length (see Kounias, pg. 184). Lemma 1 in the Kounias paper (pg. 178) shows how to construct longer Golay sequences from shorter sequences. A Golay sequence pair of length nm can be constructed from a Golay pair of length n and another Golay pair of length m. Following these construction rules, there are many possible sequence pairs of a specified length.

A particular pair for a given length can then be selected using, for example, an exhaustive search to select a pair with minimal side lobes prior to cancellation. This selection will minimize the residual side lobe energy from imperfect cancellation. Each of the Golay-pair sequences is run in the field as a separate source with some dead time allotted after each to collect seismic returns. The reference correlations and summing are processing steps.

As an example of how to generate other complementary Golay series of a given length, consider the pair of length 8 given above:

−1 −1 −1 1 −1 −1 1 −1 and −1 −1 −1 1 1 1 −1 1

Golay showed that any of the following operations on a given pair produces another pair of complementary series:

(a) Interchanging the series;

(b) Reversing the first series;

(c) Reversing the second series;

(d) Altering (replacing each element by its opposite) the first series;

(e) Altering the second series; or (f) Altering the elements of even order in each series.

Following these rules, six more complementary series of length 8 are:

−1 −1 −1 1 1 1 −1 1 and −1 −1 −1 1 −1 −1 1 −1

−1 1 −1 −1 1 −1 −1 −1and −1 −1 −1 1 1 1 −1 1

−1 −1 −1 1 −1 −1 1 −1 and 1 −1 1 1 1 −1 −1 −1

1 1 1 −1 1 1 −1 1 and −1 −1 −1 1 1 1 −1 1

−1 −1 −1 1 −1 −1 1 −1 and 1 1 1 −1 −1 −1 1 −1

−1 1 −1 −1 −1 1 1 1 and −1 1 1 −1 −1 1 −1 −1 −1

Many more complementary series of length 8 (some of which may be identical) can be generated by performing two or more of the six operations given above. In addition, these operations can be performed on the sub-sequences (e.g., pairs of length 4 and 2) prior to combination to make a length 8 sequence.

Maximal Length Shift-Register Sequence

Golomb defines a pseudo-random binary sequence ("PRBS") as any binary sequence generated by a deterministic process (such as a shift register) in such a way that the sequence will satisfy whatever tests for randomness that may be selected (see Golomb, pp. 7–16). A shift register of degree n is a device consisting of n consecutive binary (1, −1 or 1, 0) storage positions or "registers", which shifts the contents of each register to the next register down the line, in time to the regular beat of a clock or other timing device. In order to prevent the shift register from emptying by the end of n clock pulses, a "feedback term" may be compiled as a logical (i.e., Boolean) function of the contents of the n positions and fed back into the first position of the shift register.

For example, consider the case where n=4 and the feedback function is to add the contents of the third and fourth registers, the sum to become what is put into register 1 after the next shift empties it. Such addition of binary numbers is called module 2 addition and is denoted by the symbol ⊕.

Figure 4:
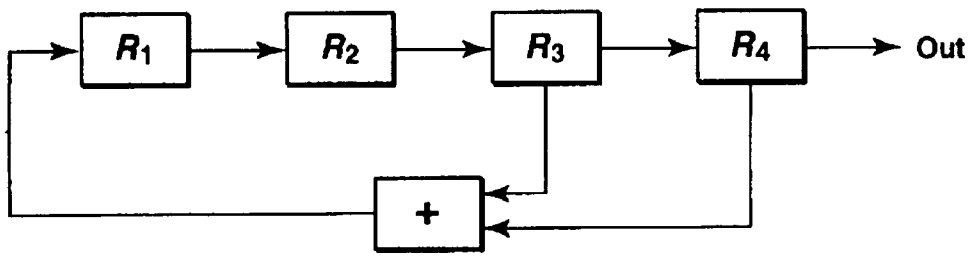
FIG. 4 is a schematic diagram of a shift register.

Thus in the binary {1,0} domain, 0⊕0=0; 0⊕1=1⊕0=1; and 1⊕1=0. Such a shift register is illustrated in FIG. 4.

It can be shown that this feedback function can be expressed as the following recursion formula:

$$X_i=X_{i-3}\oplus X_{i-4}$$

where $X_i$ is the contents of any one of the four registers for the i-th shift. Thus, the contents of any register are the modulo 2 sum of what was in that same register three shifts previously and what was in that same register four shifts previously.

Starting the process with the contents of all four registers set to 1, i.e., $X_0(X_1)=X_0(R_2)=X_0(R_3)=X_0(X_4)=1$, the four registers take on the following values before the numbers begin repeating:

| i | $X_i(R_1)$ | $X_i(R_2)$ | $X_i(R_3)$ | $X_i(R_4)$ |
|---|---|---|---|---|
| 0 | 1 | 1 | 1 | 1 |
| 1 | 0 | 1 | 1 | 1 |
| 2 | 0 | 0 | 1 | 1 |
| 3 | 0 | 0 | 0 | 1 |
| 4 | 1 | 0 | 0 | 0 |
| 5 | 0 | 1 | 0 | 0 |
| 6 | 0 | 0 | 1 | 0 |
| 7 | 1 | 0 | 0 | 1 |
| 8 | 1 | 1 | 0 | 0 |
| 9 | 0 | 1 | 1 | 0 |
| 10 | 1 | 0 | 1 | 1 |
| 11 | 0 | 1 | 0 | 1 |
| 12 | 1 | 0 | 1 | 0 |
| 13 | 1 | 1 | 0 | 1 |
| 14 | 1 | 1 | 1 | 0 |

The numbers generated in register 1 (the other registers generate the same sequence with cyclic permutation) are the "shift-register sequence" for this particular shift register of length 4 and particular recursion relationship. It can be seen that the number in register 1 for any value of i is the modulo 2 sum of the numbers in register 3 and 4 one shift previously which, in turn, are the same two numbers that were in register 1 three and four shifts previously, as required by the recursion formula. This sequence satisfies, for example, the following three randomness tests which are proposed by Golomb at page 10 of his book:

1. In each period of the sequence, the number of ONE's differs from the number of ZERO's by at most 1.
2. Among the "runs" of ONE's and of ZERO's in each period, one-half the runs of each kind are of length one, one-fourth are of length two, one-eighth are of length three, etc., as long as these fractions give meaningful numbers of runs.
3. If a period of the sequence is compared, term by term, with any cyclic shift of itself, the number of agreements differs from the number of disagreements by at most 1.

In the sequence of length 15 generated above (register 1), there are 8 ONE's and 7 ZERO's, satisfying test 1. The sequence has 5 runs of length one, 2 of length two, and 2 of length three, which closely satisfies test 2. (A "run" occurs where a number is repeated in the sequence, except for a run of length one which is a single occurrence.) Comparing the sequence of register 1 with that of register 4, which is a cyclic permutation of the register 1 sequence, shifted 3 positions, one finds 7 agreements and 8 disagreements, satisfying test 3. This consistent satisfaction of randomness tests is a difference between pseudo-random series and truly random series. Because they are deterministic, each and every pseudo-random series will satisfy the test. Truly random series will satisfy the tests only on average.

The output of any shift register is ultimately periodic, with a period not exceeding $2^N$ where n is the degree, or length, of the shift register (Golomb, p. 9). For linear recursion formulas, defined by Golomb at page 9, the period is at most $2^n-1$. In the example above, where n=4, the period is 15 and therefore the sequence generated above has the maximum possible length, and accordingly is called a maximal length shift-register sequence.

Figure 5A:
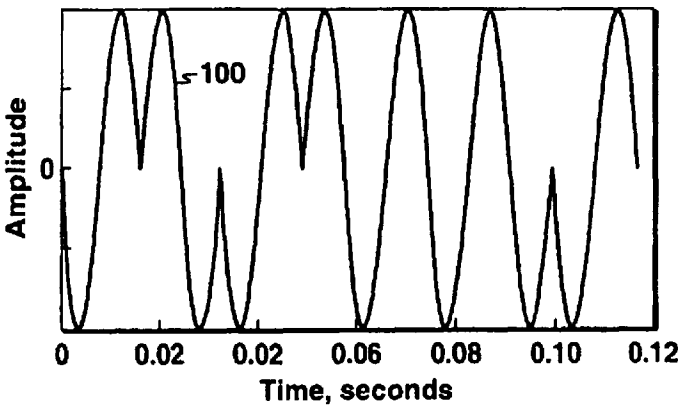
FIG. 5A illustrates a maximal length shift-register sequence with 60 Hz waveform element.
Figure 5B:
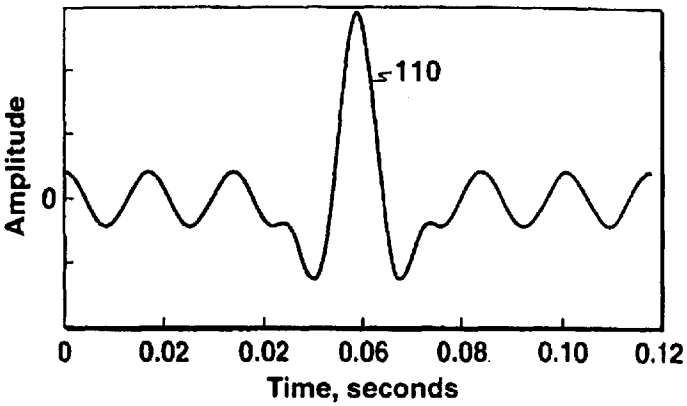
FIG. 5B shows its autocorrelation.

An example of a maximal length shift-register sequence of length 7 is $\{-1\ 1\ -1\ 1\ 1\ 1\ -1\}$. FIG. 5A shows the resulting extended waveform segment 100 using a 60 Hz element. The circular autocorrelation 110 of waveform 100 is shown in FIG. 5B. The central portion of waveform 110 is the autocorrelation of a 60 Hz cycle and the side lobes are 60 Hz with relative amplitude of 1/7 (for a length 7 sequence). This level of side lobes might be acceptable for long sequences but alternate approaches are possible.

Figure 6A:
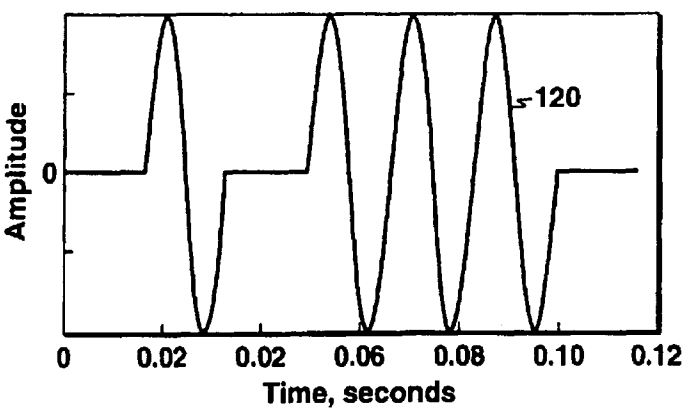
FIG. 6A illustrates a modified shift-register sequence with 60 Hz waveform element.
Figure 6B:
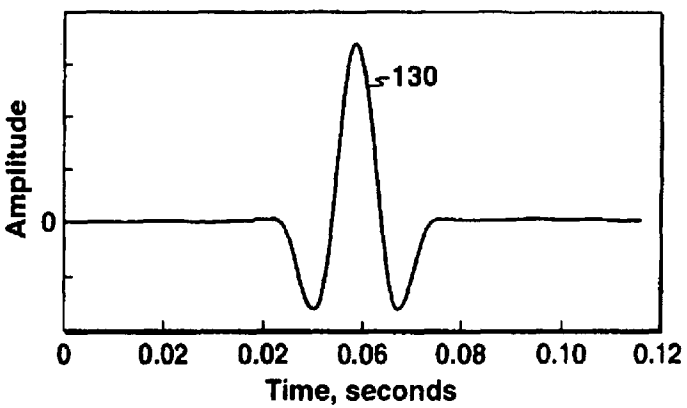
FIG. 6B shows the cross correlation of the wave of FIG. 6A with the wave of FIG. 5A.

Foster and Sloan, for example, altered waveform 100 to include only the positive binary elements 120, with the negative elements replaced by zero-amplitude elements, as shown in FIG. 6A. (Foster, M. R., and Sloan, R. W., "The Use of Pseudonoise Sequences to Code a Pulsed Neutron Logging Source", Geophysics (1972) Vol. 37, 481–487). When circularly correlated using waveform 100 (FIG. 5A) as the reference, the result 130 now has zero side lobes (FIG. 6B). The disadvantage of this approach is that the peak value is roughly halved because of the zero-amplitude elements.

To explain terms used above, autocorrelation means the correlation of a signal with itself. Circular correlation can be explained as follows: In a standard correlation process, the signals are assumed to be "zero-padded" prior to correlation, i.e., the signal wave sequence and its reference are assumed to drop to zero amplitude before and after the sequence. The correlation process involves the cross product of one signal and a shifted version of the second signal for various shifts. With the zero padding, the portion of the shifted signal that passes the end of the stationary signal has no effect because it is multiplied by the appended zeros. In the case of circular correlation, the signals are assumed to repeat rather than have zero padding. Thus, as the shifted signal passes the end of the stationary signal in the correlation process, it begins to overlap the beginning of the stationary signal. Where circular correlation is used, it is used because it reduces the side lobes better than standard correlation.

The choice of a binary sequence and waveform element will depend on the target, the geology, and the field configuration. The decision on a waveform element would be based largely on the target depth and the expected attenuation. The decision on the binary sequence type would be based on the relative level of direct electromagnetic pickup and, consequently, the need for side lobe reduction. An appropriate selection will likely require computer modeling and field tests. As discussed further below, the longer the sequences, the more the side lobes will be reduced. Capabilities of the recording equipment are a practical limit on sequence length. Although the present invention is primarily for use on land, it can give useful results in a marine environment.

In general, longer binary sequences tend to produce lower correlation side lobes than shorter sequences. In the case of waveforms generated by maximal length shift-register sequences, it is known that the amplitudes of the side lobes after the sequence is circularly correlated with itself varies as 1/L where L is the length of the sequence. Therefore, longer maximal length shift-register sequences are preferred. Truly random sequences are known to exhibit a lesser reduction with length, varying inversely as the square root of the length, but this effect is manifested on a statistical basis.

The other preferred type of binary coding for the present invention, Golay sequence pairs, are neither pseudo-random nor random. They also tend to show an inverse dependence of side lobe amplitude with sequence-length, but the dependence is much weaker than 1/L. Although side lobe cancellation for Golay pairs is theoretically perfect, regardless of sequence-length, it is unlikely that this perfect cancellation will be achieved in practice as pointed out above. Therefore, Golay sequences are preferably chosen to have minimal side lobes before the pairs are added together, and sequence length is one factor in such a selection. Other than length, the basis for choosing a sequence is the same as with PRBS sequences: one must try various sequences and observe what side lobe attenuation is achieved.

The correlation for Golay sequences is standard correlation. Pseudo-random sequences need circular correlation to best reduce side lobes, which tends to place a practical limit on the length of such sequences. A pseudo-random sequence needs to be repeated (in the field) at least once to provide circular overlap. The first cycle can be used only to provide delayed correlation effects on the next cycle, and hence is lost for data-gathering purposes. While a longer PRBS is preferred for side lobe reduction, a shorter PRBS is preferred to avoid data loss and waste of field time. The preferred compromise is to use an intermediate length PRBS and repeat it several times, perhaps three to seven cycles in all. Thus a maximal-length shift register sequence of length 255 might be selected and repeated six times for a total of seven cycles. This would consume about 28 seconds in the field assuming a 60 Hz wave element, and only 1/7 of the data would be, in effect, lost. The data thus gathered from such a PRBS example would compare fairly closely in quantity to that obtained from a Golay-pair sequence of length 1664 (as 6×255=1530 compares to 1664).

Figure 7:
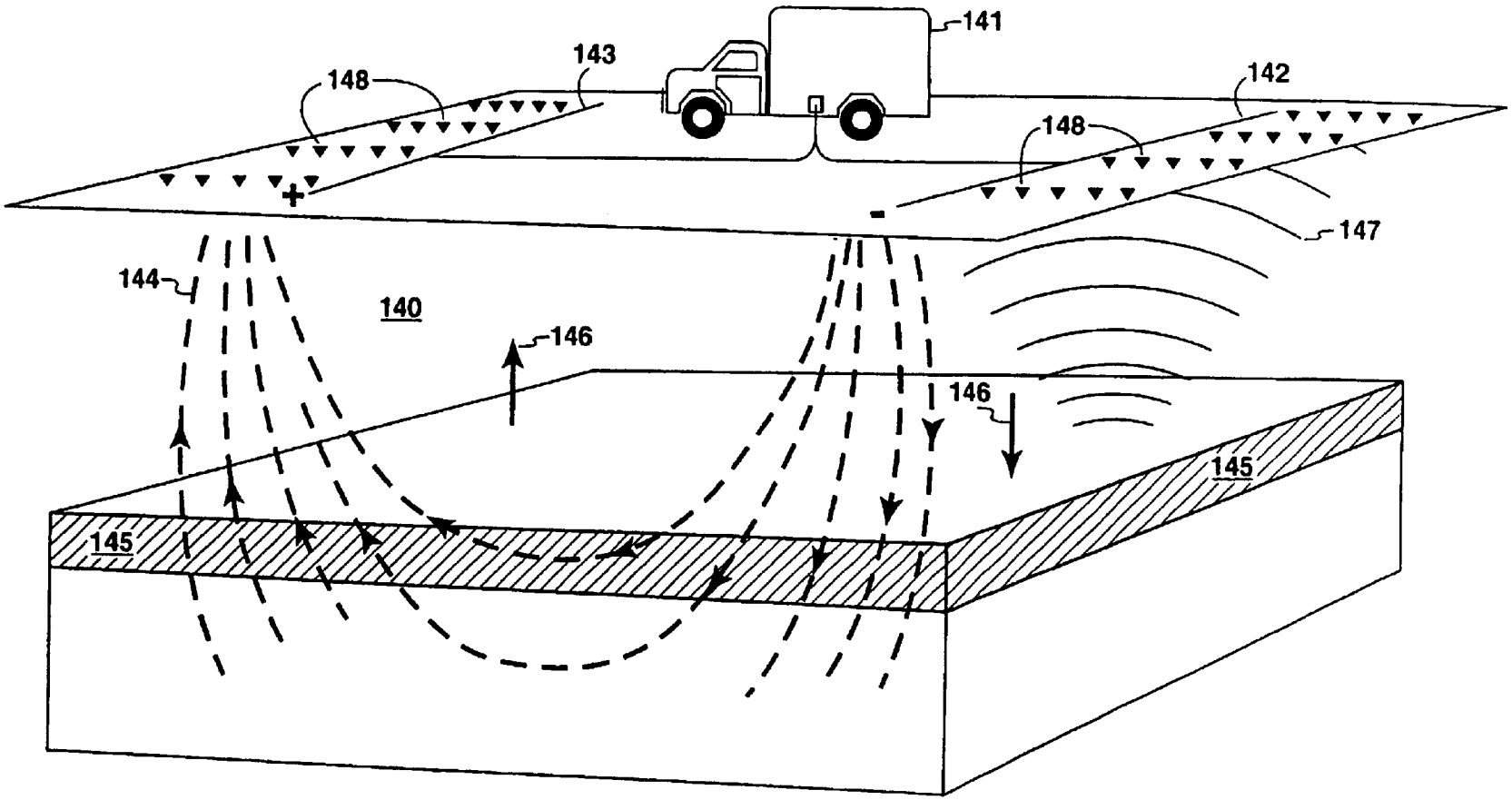
FIG. 7 illustrates a typical field setup for the present invention.

FIG. 7 is a diagram of a possible field layout for deployment of the present invention. Electric current is injected into the subsurface 140 by applying a voltage from a power source 141 between two buried electrode wires 142 and 143. The electrode wires are typically bare 4/0 copper cable. Other sizes of cable may be used as needed to conduct the needed current. The electrode wires should be buried just deep enough to make good electrical contact with the soil. Typically, this depth will be in the range from 1 inch to 10 feet, but in some cases, such as particularly dry surface soil, even deeper burial may be desirable.

FIG. 7 shows the current paths 144. The direction shown is that of the flow of electrons, from the negative electrode to the positive electrode. The power source 141 provides the current and consists primarily of a waveform generator capable of generating the binary-coded waveform segments preferred by the present invention. The ultimate power source is typically the local electrical utility power lines (connection not shown in FIG. 7). One or more generators may also be used. The current paths 144 shown in FIG. 7 represent those current paths that penetrate down to the depth of the target 145, typically a petroleum reservoir. Such current trajectories will be nearly vertical below the electrode. Experience shows that the maximum vertical current 146 will typically be directly under or even slightly to the outside of the electrode wires. Accordingly, the maximum amplitude of the resulting surface-directed seismic wave 147 (similar wave below positive electrode not shown) will occur along the line of maximum vertical current, and this determines the preferred location of the seismic detectors 148.

The seismic detectors may be placed anywhere on the surface, but the preferred location is outside the electrode wires rather than between the electrode wires. The seismic detectors may be geophones, hydrophones, accelerometers or any similar device. Such seismic equipment is well known to those skilled in the art. Preferably, the seismic detectors are buried beneath the surface to reduce seismic noise.

Typically, the configuration shown in FIG. 7 is designed to cover the entire area of interest i.e., source and receivers will not need to be repeatedly moved to progressively cover the area of interest as with conventional seismic. This is one advantage of the electroseismic method, although a single setup is not essential to using the present invention. (The electrode wires and receivers may be dug up when the experiment is over and moved to other locations.) Accordingly, the length of the electrodes may vary between one-tenth of the reservoir (target) depth to several times the reservoir depth. The separation between electrodes in preferred embodiments of the present invention will be approximately equal to the target depth.

In electroseismic surveying, the electromagnetic source wave reaches all of the target at essentially the same instant of time. One is therefore usually interested only in the upward-traveling seismic waves that arrive at all of the geophones at approximately the same time, assuming the geophones are deployed as in FIG. 7. Thus, in processing, the ordinary seismic noise can be filtered out because it exhibits what in the seismic art is called "moveout". The source-to-receiver distance, called "offset", is small in electroseismic prospecting. In a conventional seismic survey, a much larger surface area would have to be covered because the longer offsets would be needed from every shot point to provide sufficient signal-to-noise ratio in common mid-point gathers. The area reduction in electroseismic vs. conventional seismic may be approximately fourfold.

The binary-coded waveforms discussed above meet the five requirements for electroseismic exploration stated previously. The need for large current levels is addressed since these are continuous waveforms instead of, for example, pulses that would have significant dead time. The use of simple 60 Hz (or constructed 3-phase) elements also allow large current levels and high electrical efficiency since the related hardware is simplified. The lack of DC is assured since each waveform element (e.g., a full cycle at 60 Hz) has no DC component (i.e., its mean value is zero); it follows, therefore, that a set of such elements would have no DC component. The frequency content of the source can be matched to the exploration target by adjusting the frequency of the waveform element. Finally, minimization of side lobes has been discussed at length.

To further explain the preceding statement about adjusting the frequency of the source to achieve the desired depth penetration, neither the source wave nor the return seismic response is composed of a single frequency. The phase inversions and (in some embodiments) the zeroing of certain elements produce waves composed of many frequencies in the sense of their Fourier analysis decomposition. This is necessary to the invention, i.e., that the waves have a bandwidth of frequencies. If the seismic return wave were a single frequency, there would be no wave that would cross-correlate with it to produce a localized pulse in the processing step. A bandwidth of frequencies is needed to produce the desired spike. Elementary Fourier analysis teaches that the sharper the spike, the wider the needed bandwidth. Thus, although the source and return waves each have a spread of frequencies, it is reasonable to expect, and Fourier decomposition can prove, that the frequency distribution of both waves will peak at the frequency of the building block, the waveform element. Thus, the desired subsurface penetration may be achieved by varying the frequency of the waveform element.

Figure 8:
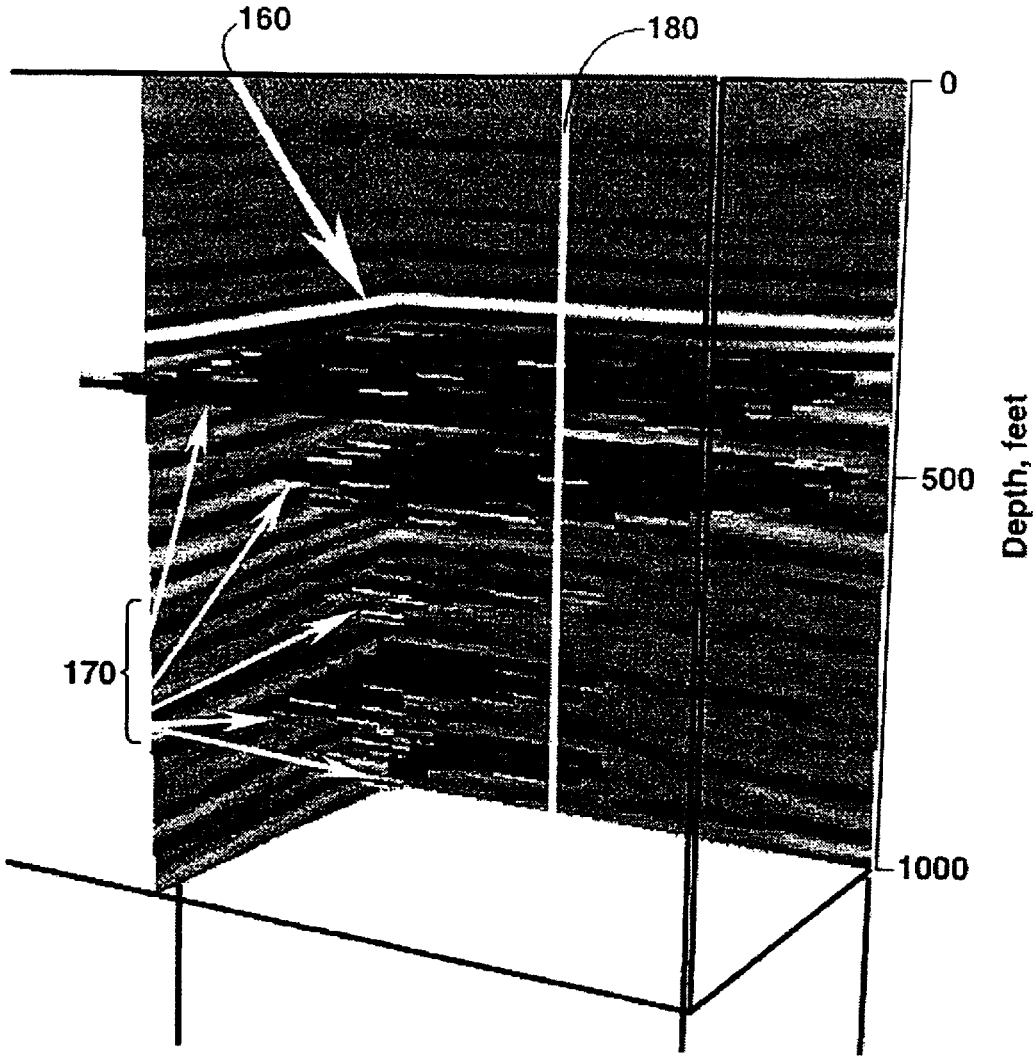
FIG. 8 illustrates test results.

FIG. 8 illustrates the results obtained by applying the present inventive method at the Friendswood gas field in Texas. The region depicted is in the vicinity of Well No. 181. The site was selected based on knowledge of gas leakage at the surface indicating shallow gas deposits located above the producing formations. A conventional seismic survey of the area showed seismic bright reflections shown in FIG. 8, of which band 160 is by far the most prominent. The five dark bodies 170 represent regions of high amplitude electroseismic signal. Electroseismic signals of less than about half the peak value are made transparent by the display. The detected signal was 10:1 or more above background, on average. (FIG. 8 is an artist's rendition of a display produced by the GEOVIS program marketed by Geospace Corporation.) Vertical seismic profiles and previous seismic data were used to establish time-to-depth conversion.

A test well was drilled to a depth of 1,000 feet to check the seismic interpretations that can be made from FIG. 8 by anyone of ordinary experience in the seismic art. The well line is shown in FIG. 8 at 180. The well logs confirmed gas sands at four of the five locations 170. The one not confirmed is the one intermediate in depth, which is barely contacted by the well as can be seen in FIG. 8. The conventional seismic reflection surface 160 turned out to be a shale layer sealing the uppermost gas sand 170. (Shales can have much higher acoustic velocities than surrounding substances which makes them strong seismic reflectors.) Only the uppermost of the five gas sands predicted by the present invention is predictable from the conventional seismic results. Note that the present invention indicates in this example the hydrocarbon deposits themselves, not a structure that may or may not trap or include hydrocarbons.

The electroseismic source signal used at Friendswood was constructed from a 60 Hz sinusoid, using Golay complementary pair sequences of length 1664, producing a sweep of duration 27.73 seconds. This sweep was repeated approximately 500 times for each of the Golay pair of signals. This repetition tends to reduce ambient noise, relative to the seismic signal, because the ambient noise occurs at random phases relative to the signal.

The field layout for the Friendswood test was similar to that shown in FIG. 7. The length of the electrode wires was approximately 800 feet and the electrode spacing was approximately 650 feet. Geophones were placed at 180 surface locations on an 18×10 grid to the outside of one of the electrodes only, this being sufficient to test the method. Two sets of geophone strings were used at each surface location. The geophones on one string differed from those on the other only in the direction of the coil windings. The geophones used operate on the principle that slight tremors move a wire coil through a fixed magnetic field generating an electric signal. Reversing the coil windings reverses the polarity of the unwanted electromagnetic pickup without affecting the desired signal generated by the moving coil. Combining the outputs of the two oppositely wound geophone strings tends to produce a cancellation of unwanted pickup.

The signal generator, which may be called a power waveform synthesizer, used in the Friendswood test produced a power output of approximately 100 kw, delivered at 120 volts peak voltage. Because the impedance of the ground is low, the waveform synthesizer must be capable of high current levels. The primary challenge in designing or assembling such a power synthesizer is in meeting the high power (current) requirements. This can be done by persons skilled in hardware design using commercially available components.

Finally, the applied electrical signals were recorded in the field as they were transmitted into the ground at Friendswood. This record is then used as the correlation reference waveform in the data processing stage, thus providing the most accurate reference waveform possible, one that accounts for actual line voltage and similar fluctuations. The recorded signal may either be a voltage signal or a current signal. In the case of the test example represented by FIG. 8, a current signal was recorded.

The foregoing description is directed to particular embodiments of the present invention for the purpose of illustrating it. It will be apparent, however, to one skilled in the art that many modifications and variations to the embodiments described herein are possible. For example, other source waveform elements and binary sequences can be used as long as they satisfactorily meet the five requirements listed above. As noted previously, correlations side lobe amplitude varies inversely with the length of the extended waveform segment for any pseudo-random waveform. Thus, there are many possible choices of waveform element and binary sequencing that will give satisfactory results within the framework of the present invention as described above. Moreover, the present invention does not require that the source waveform be generated by binary sequencing of a single waveform element, or by binary sequencing in any manner. All such modifications and variations are intended to be within the scope of the present invention, as defined in the appended claims.

We claim:

1. A method for electroseismic prospecting of a subterranean formation, said method comprising the steps of:

(*a*) selecting a source waveform and corresponding reference waveform, said two waveforms being selected to reduce amplitudes of side lobes produced by correlating said source waveform with said reference waveform;

(*b*) generating said source waveform as an electrical signal and transmitting said electrical signal into said subterranean formation;

(*c*) detecting and recording seismic signals resulting from conversion of said electrical signal to seismic energy in said subterranean formation; [and]

(*d*) correlating said recorded seismic signals with said reference waveform[.] *to produce a correlated seismic record; and*

(*e*) *creating an image of the subterranean formation from the correlated seismic record.*

2. The method of claim 1, wherein said source waveform is constructed from a single element, said element consisting of a single full cycle of a preselected periodic waveform, said elements being pieced together with polarities sequentially specified by a preselected binary code, said periodic waveform having a frequency predetermined to give desired depth penetration of said subterranean formation.

3. The method of claim 2, wherein said waveform element in a single cycle of a 60 Hz sinusoid.

4. The method of claim 2, wherein said waveform element is constructed from selected phases of a three-phase power supply to have a desired frequency less than 60 Hz.

5. The method of claim 2, wherein said binary code is pseudo-random, said source waveform has a predetermined length, said length being sufficient to further reduce said correlation side lobes to a predetermined level, said reference waveform is said source waveform, and said correlation is circular correlation.

6. The method of claim 5, wherein said binary code is a maximal length shift-register sequence.

7. The method of claim 2, wherein said binary code is a maximal length shift-register sequence with said resulting source waveform modified such that negative polarity elements in said source waveform are zeroed, said reference waveform is said source waveform before said negative polarity waveform elements are zeroed, and said correlation is circular correlation.

8. A method for electroseismic prospecting of a subterranean formation, said method comprising the steps of:

(*a*) constructing a first source waveform and a second source waveform from a single element, said element consisting of a single full cycle of a preselected periodic waveform, said periodic waveform having a frequency predetermined to give desired depth penetration of said subterranean formation, said elements being pieced together with polarities specified sequentially by one member of a Golay complementary pair of binary sequences in the case of said first source waveform, and by the second member of said Golay complementary pair in the case of said second source waveform;

(*b*) generating each of said two source waveforms as an electrical signal, and transmitting each said electrical signal, in turn, into said subterranean formation;

(*c*) detecting and recording seismic signals resulting from conversion of said electrical signals to seismic energy in said subterranean formation;

(*d*) correlating said recorded seismic signals from each of said source waveforms with said respective source waveform itself; [and]

(*e*) summing said pair of correlations of said recorded seismic signals and their corresponding source waveform[.] *to produce a correlated seismic record; and*

(*f*) *creating an image of the subterranean formation from the correlated seismic record.*

9. The method of claim 8, wherein said waveform element is a single cycle of a 60 Hz sinusoid.

10. The method of claim 8, wherein said Golay complementary pair of binary sequences are selected from other Golay pairs using the criteria of smallest autocorrelation side lobe amplitudes prior to summing.

[11. An electrical signal for use in electroseismic prospecting of a subterranean formation, said signal having a waveform constructed from a single element, said element consisting of a single full cycle of a preselected periodic waveform, said elements being pieced together with polarities sequentially specified by a preselected binary code, said periodic waveform having a frequency predetermined to give desired depth penetration of said subterranean formation, said binary code being selected to generate side lobe amplitudes below a predetermined level when the signal waveform is correlated with itself.]

[12. The electrical signal of claim 11, wherein said waveform element is a single cycle of a 60 Hz sinusoid.]

[13. The electrical signal of claim 11, wherein said waveform element is constructed from selected phases of a three-phase power supply to have a desired frequency less than 60 Hz.]

[14. The electrical signal of claim 11, wherein said binary code is pseudo-random and said correlation is circular correlation.]

[15. The electrical signal of claim 14, wherein said signal waveform has a predetermined length, said length being sufficient to further reduce said side lobe amplitudes to a predetermined level.]

[16. The electrical signal of claim 14, wherein said binary code is a maximal length shift-register sequence.]

[17. An electrical signal for use in electroseismic prospecting of a subterranean formation, said signal having a waveform constructed from a single element, said element consisting of a single full cycle of a preselected periodic waveform, said periodic waveform having a frequency predetermined to give desired depth penetration of said subterranean formation, said elements being pieced together with polarities sequentially specified by a maximal length shift-register sequence, said resulting signal waveform being modified such that resulting negative polarity elements are zeroed.]

[18. A pair of complementary electrical signals for use in conjunction with each other in electroseismic prospecting of a subterranean formation, said signals having waveforms constructed from a single element, said element consisting of a single full cycle of a preselected periodic waveform, said periodic waveform having a frequency predetermined to give desired depth penetration of said subterranean formation, said elements being pieced together with polarities sequentially specified by one member of a Golay complementary pair of binary sequences in the case of one of said two electrical signals, and by the second member of said Golay complementary pair in the case of the other electrical signal.]

[19. The electrical signals of claim 18, wherein said waveform element is a single cycle of a 60 Hz sinusoid.]

[20. The electrical signals of claim 18, wherein said waveform element is constructed from selected phases of a three-phase power supply to have a desired frequency less than 60 Hz.]

*21. A method for electroseismic prospecting of a subterranean formation, said method comprising:*

(*a*) *obtaining a source waveform selected to reduce amplitudes of side lobes produced by correlation with a selected reference waveform;*

(*b*) *generating the selected source waveform as an electrical signal and transmitting it into the subterranean formation;*

(*c*) *detecting and recording seismic signals resulting from conversion of the electrical signal to seismic energy in the subterranean formation;*

(*d*) *obtaining a correlated seismic record generated by correlating the seismic signals with the reference waveform; and*

(*e*) *obtaining an image of the subterranean formation produced from the correlated seismic record.*

*22. The method of claim 21, wherein said source waveform is constructed from a single element, said element consisting of a single full cycle of a preselected periodic waveform, said elements being pieced together with polarities sequentially specified by a preselected binary code, said periodic waveform having a frequency predetermined to give desired depth penetration of said subterranean formation.*

*23. The method of claim 22, wherein the waveform element is a single cycle of a 60 Hz sinusoid.*

*24. The method of claim 22, wherein the waveform element is constructed from selected phases of a three-phase power supply to have a desired frequency less than 60 Hz.*

*25. The method of claim 22, wherein said binary code is pseudo-random, said source waveform has a predetermined length, said length being sufficient to further reduce said correlation side lobes to a predetermined level, said reference waveform is said source waveform, and said correlation is circular correlation.*

*26. The method of claim 25, wherein said binary code is a maximal length shift-register sequence.*

*27. The method of claim 22, wherein said binary code is a maximal length shift-register sequence with said resulting source waveform modified such that negative polarity elements in said source waveform are zeroed, said reference waveform is said source waveform before said negative polarity waveform elements are zeroed, and said correlation is circular correlation.*

*28. A method for electroseismic prospecting of a subterranean formation, said method comprising:*

(*a*) *selecting a source waveform and corresponding reference waveform, said two waveforms being selected to*

*reduce amplitudes of side lobes produced by correlating said source waveform with said reference waveform;*

(*b*) *obtaining recorded seismic signals resulting from generation of said source waveform into an electrical signal and transmitting it into said subterranean formation;*

(*c*) *correlating said recorded seismic signals with said reference waveform to produce a correlated seismic record; and*

(*d*) *creating an image of the subterranean formation from the correlated seismic record.*

*29. The method of claim 28, wherein said source waveform is constructed from a single element, said element consisting of a single full cycle of a preselected periodic waveform, said elements being pieced together with polarities sequentially specified by a preselected binary code, said periodic waveform having a frequency predetermined to give desired depth penetration of said subterranean formation.*

*30. The method of claim 29, wherein the waveform element is a single cycle of a 60 Hz sinusoid.*

*31. The method of claim 29, wherein the waveform element is constructed from selected phases of a three-phase power supply to have a desired frequency less than 60 Hz.*

*32. The method of claim 29, wherein said binary code is pseudo-random, said source waveform has a predetermined length, said length being sufficient to further reduce said correlation side lobes to a predetermined level, said reference waveform is said source waveform, and said correlation is circular correlation.*

*33. The method of claim 32, wherein said binary code is a maximal length shift-register sequence.*

*34. The method of claim 29, wherein said binary code is a maximal length shift-register sequence with said resulting source waveform modified such that negative polarity elements in said source waveform are zeroed, said reference waveform is said source waveform before said negative polarity waveform elements are zeroed, and said correlation is circular correlation.*

*35. A method for electroseismic prospecting of a subterranean formation, said method comprising:*

(*a*) *obtaining two source waveforms constructed by repeating a single element, said element consisting of a single full cycle of a periodic waveform, said periodic waveform having a frequency determined to give desired depth penetration of the subterranean formation, said elements being pieced together with polarities specified sequentially by one member of a Golay complementary pair of binary sequences in the case of one source waveform, and by the second member of the Golay complementary pair in the case of the other source waveform;*

(*b*) *generating each of the two source waveforms as an electrical signal and transmitting each said electrical signal, in turn, into the subterranean formation;*

(*c*) *detecting and recording seismic signals resulting from conversion of each of the two electrical signals to seismic energy in the subterranean formation;*

(*d*) *obtaining a correlated seismic record generated by correlating the seismic signals with the source waveform used to generate them and then summing the correlated record due to one source waveform with the correlated record due to the other source waveform; and*

(*e*) *obtaining an image of the subterranean formation produced from the summed correlated seismic record.*

*36. The method of claim 35, wherein said waveform element is a single cycle of a 60 Hz sinusoid.*

*37. The method of claim 35, wherein said Golay complementary pair of binary sequences are selected from other Golay pairs using the criteria of smallest autocorrelation side lobe amplitudes prior to summing.*

*38. A method for electroseismic prospecting of a subterranean formation, said method comprising:*

(*a*) *constructing a first source waveform and a second source waveform from a single element, said element consisting of a single full cycle of a pre-selected periodic waveform, said periodic waveform having a frequency pre-determined to give desired depth penetration of the subterranean formation, said elements being pieced together with polarities specified sequentially by one member of a Golay complementary pair of binary sequence in the case of the first source waveform and by the second member of the Golay complementary pair in the case of the second source waveform;*

(*b*) *obtaining recorded seismic signals resulting from generation of each of said two source waveforms as an electrical signal and transmission of each electrical signal, in turn, into the subterranean formation where each was converted to seismic energy,*

(*c*) *correlating said recorded seismic signals from each of the two source waveforms with the corresponding source waveform itself, thereby producing two correlated records;*

(*d*) *summing the two correlated records to produce a correlated seismic record; and*

(*e*) *creating an image of the subterranean formation from the correlated seismic record.*

*39. The method of claim 38, wherein said waveform element is a single cycle of a 60 Hz sinusoid.*

*40. The method of claim 38, wherein said Golay complementary pair of binary sequences are selected from other Golay pairs using the criteria of smallest autocorrelation side lobe amplitudes prior to summing.*

* * * * *